(12) United States Patent
Arenson et al.

(10) Patent No.: US 8,488,854 B2
(45) Date of Patent: Jul. 16, 2013

(54) SYSTEM AND APPARATUS FOR CLASSIFYING X-RAY ENERGY INTO DISCRETE LEVELS

(75) Inventors: Jerome Stephen Arenson, Haifa (IL); Ofer Pinhasi, Brookfield, WI (US); Daniel Rubin, Haifa (IL); Baruch Rosner, Haifa (IL); Lev Greenberg, Haifa (IL)

(73) Assignee: GE Medical Systems Israel, Ltd. (IL)

( * ) Notice: Subject to any disclaimer, the term of this patent is extended or adjusted under 35 U.S.C. 154(b) by 104 days.

(21) Appl. No.: 13/313,281

(22) Filed: Dec. 7, 2011

(65) Prior Publication Data

US 2013/0148873 A1 Jun. 13, 2013

(51) Int. Cl.
*G06K 9/00* (2006.01)
*G01N 23/00* (2006.01)

(52) U.S. Cl.
USPC .............................................. 382/128; 378/1

(58) Field of Classification Search
None
See application file for complete search history.

(56) References Cited

U.S. PATENT DOCUMENTS

| | | | | |
|---|---|---|---|---|
| 4,061,920 A * | 12/1977 | Mollendorf et al. | ............ | 378/97 |
| 4,529,882 A * | 7/1985 | Lee | ............ | 250/363.1 |
| 6,035,013 A * | 3/2000 | Orava et al. | ...................... | 378/37 |
| 6,248,990 B1 | 6/2001 | Pyyhtia et al. | ............. | 250/208.1 |
| 6,355,923 B2 * | 3/2002 | Pyyhtia et al. | ............. | 250/208.1 |
| 6,539,410 B1 * | 3/2003 | Klass | ............................ | 708/255 |
| 7,145,150 B2 * | 12/2006 | Chugg | ..................... | 250/370.01 |
| 7,149,278 B2 | 12/2006 | Arenson et al. | | |
| 7,180,074 B1 * | 2/2007 | Crosetto | .................. | 250/370.09 |
| 7,260,170 B2 | 8/2007 | Arenson et al. | | |
| 7,260,171 B1 | 8/2007 | Arenson et al. | | |
| 7,330,527 B2 | 2/2008 | Hoffman et al. | | |
| 7,330,535 B2 | 2/2008 | Arenson et al. | | |
| 7,335,887 B1 * | 2/2008 | Verbinski et al. | .......... | 250/358.1 |
| 7,336,769 B2 | 2/2008 | Arenson et al. | | |
| 7,365,332 B2 * | 4/2008 | Verbinski et al. | .......... | 250/358.1 |
| 7,382,853 B2 | 6/2008 | Arenson et al. | | |
| 7,408,160 B2 * | 8/2008 | Verbinski et al. | .......... | 250/358.1 |
| 7,424,090 B2 | 9/2008 | Arenson et al. | | |
| 7,514,688 B2 * | 4/2009 | Broennimann et al. | . | 250/370.11 |
| 7,547,889 B2 * | 6/2009 | Lehmann et al. | ........ | 250/370.01 |
| 7,696,483 B2 * | 4/2010 | Tkaczyk et al. | ......... | 250/370.06 |
| 7,706,508 B2 | 4/2010 | Arenson et al. | | |
| 7,737,410 B2 * | 6/2010 | Rubenstein | ............... | 250/370.08 |
| 7,769,138 B2 * | 8/2010 | Dafni | ......................... | 378/98.11 |
| 7,825,382 B2 * | 11/2010 | Campbell | ................ | 250/363.02 |
| 8,000,434 B2 * | 8/2011 | Ziegler et al. | ..................... | 378/5 |
| 8,050,385 B2 * | 11/2011 | Proksa | ......................... | 378/98.9 |
| 2007/0147585 A1 * | 6/2007 | Eilbert et al. | .................... | 378/57 |
| 2007/0242802 A1 * | 10/2007 | Dafni | ........................ | 378/98.11 |
| 2010/0195802 A1 | 8/2010 | Arenson et al. | | |

* cited by examiner

*Primary Examiner* — Manav Seth
(74) *Attorney, Agent, or Firm* — Ziolkowski Patent Solutions Group, SC

(57) ABSTRACT

A system and apparatus for classifying x-ray energy into discrete levels include an imaging system comprising an x-ray source, a detector, and a DAS having a discriminator assembly configured to count photon hits in the detector. A computer causes the discriminator assembly to count photon hits in the detector having an energy level greater than or equal to first and second threshold levels during an imaging scan, wherein the second threshold level is distinct from the first threshold level. The computer further modifies the counted photon hits having an energy level greater than or equal to the first threshold level based on the counted photon hits having an energy level greater than or equal to the second threshold level and reconstructs an image based on the modified photon hits and based on the counted photon hits having an energy level greater than or equal to a second threshold level.

22 Claims, 8 Drawing Sheets

SYSTEM AND APPARATUS FOR CLASSIFYING X-RAY ENERGY INTO DISCRETE LEVELS

BACKGROUND OF THE INVENTION

Embodiments of the invention relate generally to diagnostic imaging and, more particularly, to a method and apparatus of classifying x-ray energy into discrete levels.

Typically, in radiographic imaging systems, such as x-ray and computed tomography (CT), an x-ray source emits x-rays toward a subject or object, such as a patient or a piece of luggage. Hereinafter, the terms "subject" and "object" may be interchangeably used to describe anything capable of being imaged. The beam, after being attenuated by the subject, impinges upon an array of radiation detectors. The intensity of the attenuated beam radiation received at the detector array is typically dependent upon the attenuation of the x-rays. Each detector element of the detector array produces a separate electrical signal indicative of the attenuated beam received by each detector element. The electrical signals are transmitted to a data processing system for analysis which ultimately produces an image. In CT imaging systems, the x-ray source and the detector array are rotated about the gantry within an imaging plane and around the subject. X-ray detectors also typically include a collimator for collimating x-ray beams received at the detector.

In some x-ray or CT imaging systems, the detector includes scintillator detector cells for converting x-rays to light energy and photodiodes for receiving the light energy from the adjacent scintillator and producing electrical signals therefrom. Typically, each scintillator of a scintillator array converts x-rays to light energy. Each scintillator discharges light energy to a photodiode adjacent thereto. Each photodiode detects the light energy and generates a corresponding electrical signal. The outputs of the photodiodes are then transmitted to the data acquisition and processing system for image reconstruction.

In other x-ray or CT imaging systems, the detector includes direct conversion detector cells for converting x-rays directly to electrical signals indicative of the amount of energy in the x-rays. The direct conversion detector may be operated in a photon counting mode configured to provide information regarding each separate x-ray detected or in a current-integration mode configured to integrate the energy received from x-rays over a period of time.

A drawback of such scintillator-operated or direct-conversion-operated current-integrating detectors, however, can be their inability to provide data or feedback as to the number and/or energy of photons detected as their signal outputs are a mix of the number of and the energy of the incident photons. That is, for current integrating detectors, either scintillator-based or direct-conversion based, the signals emitted during readout are a function of the number of x-rays impinged over a period of time as well as the energy level of the impinging x-rays. As x-ray imaging systems almost exclusively involves polychromatic (multi-energy) x-ray sources, the combinations of number and energy of impinging broad-spectrum photons is variable. This variability depends heavily on the x-ray source used and the type and thickness of material examined. Under the charge or current integration operation mode, the detector is not capable of discriminating between the energy level or the photon count from individual photons when two or more photons are detected of different x-ray photon energies. For example, two integration-based detector cells may produce an equivalent output from their respective photodiodes, although the number and energy of the photons impinging on each detector may be substantively different.

For providing data or feedback as to the number and energy of photons detected at the detector, x-ray or CT imaging systems may use the direct conversion detector in a photon counting mode that includes detector cells capable of providing data as to the number and energy of the photons detected. Alternatively, the x-ray or CT imaging systems may use a fast scintillator detector that includes detector cells capable of providing data very quickly after the photon is received that indicates the energy of the detected photon prior to receiving another photon. In addition, a data acquisition system (DAS) coupled to the detector is provided to sort the photons into energy storage bins based on their detected energy. Conventional photon-counting imaging systems often employ multiple hardware energy storage bins for classifying the photons. As the number of energy bins increases, the amount of spectral information about the incoming x-ray beam also increases. That is, the ability to classify photons into, for example, two different energy bins provides more detailed information than classifying the same photons into only one energy bin (such as all photons having an energy above a base noise level). Likewise, classifying the photons into five different energy bins provides more detailed information than classifying the same photons into the two energy bins in the previous example.

However, as the number of energy bins increases, so does the cost and complexity of the imaging system. In addition, to add additional energy bins to an existing system in order to increase its bin count or to replace the entire DAS with another DAS having more energy bins is also cost-prohibitive.

Therefore, it would be desirable to design a system and method for classifying photons into a number of energy classifications or bins greater than the number of hardware energy storage bins in the DAS of an imaging system.

BRIEF DESCRIPTION OF THE INVENTION

According to an aspect of the invention, an imaging system comprises an x-ray source configured to project a beam of x-rays toward an object to be imaged, a detector configured to receive x-rays emitted from the x-ray source, and a data acquisition system (DAS) operably coupled to the detector, the DAS comprising a discriminator assembly configured to count photon hits in the detector that occur at photon energies greater than or equal to a threshold level. A computer is operably coupled to the DAS and programmed to cause the discriminator assembly to count photon hits in the detector having an energy level greater than or equal to a first threshold level during an imaging scan and to cause the discriminator assembly to count photon hits in the detector having an energy level greater than or equal to a second threshold level during the imaging scan, wherein the second threshold level is distinct from the first threshold level. The computer is further programmed to modify the counted photon hits having an energy level greater than or equal to the first threshold level based on the counted photon hits having an energy level greater than or equal to the second threshold level and to reconstruct an image based on the modified photon hits and based on the counted photon hits having an energy level greater than or equal to the second threshold level.

According to another aspect of the invention, a non-transitory computer readable medium has thereon a computer program comprising instructions, which, when executed by a computer, cause the computer to cause an x-ray source to project a plurality of x-ray beams toward an object to be imaged, to cause a detector to convert received x-rays into photon energy information, and to cause a discriminator assembly to count photon energy levels from the photon energy information having an energy level greater than or equal to a first threshold level during a first set of the plurality of x-ray beams. The instructions further cause the computer to cause the discriminator assembly to count photon energy levels from the photon energy information having an energy level greater than or equal to a second threshold level during a second set of the plurality of x-ray beams, wherein the second threshold level is different from the first threshold level. The instructions further cause the computer to modify the photon hits counted from the first set of the plurality of x-ray beams based on the photon hits counted from the second set of the plurality of x-ray beams and to reconstruct an image based on the modified photon hits and based on the photon hits counted from the second set of the plurality of x-ray beams.

According to yet a further aspect of the invention, an x-ray system comprises a high frequency electromagnetic energy projection source configured to project a high frequency electromagnetic energy beam toward an object to be scanned during an imaging scan and a direct conversion array having a plurality of direct conversion cells wherein each cell is configured to detect high frequency electromagnetic energy passing through the object and to convert the detected energy into electrical energy signals during each of a plurality of x-ray views. A data acquisition system (DAS) is connected to the direct conversion array and configured to receive the electrical photon energy signals, wherein the DAS comprises a plurality of hardware discriminator channels, and wherein each hardware discriminator channel is configured to count a number of photons having an energy greater than or equal to a respective energy threshold level from the electrical photon energy signals. A computer is programmed to input a first set of energy threshold levels to the respective hardware discriminator channels during a first set of the plurality of x-ray views and to input a second set of energy threshold levels to the respective hardware discriminator channels during a second set of the plurality of x-ray views. The computer is also programmed to obtain a plurality of photon counts during the first and second sets of x-ray views from photons having energy levels greater than or equal to the respective first and second sets of energy threshold levels and to transform a first photon count of the plurality of photon counts based on a second photon count of the plurality of photon counts. The x-ray system also comprises an image reconstructor connected to the computer and configured to reconstruct an image of the object based on the transformed first photon count and on the second photon count.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

The operating environment of the invention is described with respect to a computed tomography (CT) system. It will be appreciated by those skilled in the art that the invention is applicable for use with multi-slice or even single slice configurations. Moreover, the invention will be described with respect to the detection and conversion of x-rays. However, one skilled in the art will further appreciate that the invention is equally applicable for the detection and conversion of other high frequency electromagnetic energy. The invention will be described with respect to a "third generation" CT scanner, but is equally applicable with other x-ray or CT systems.

Figure 1:
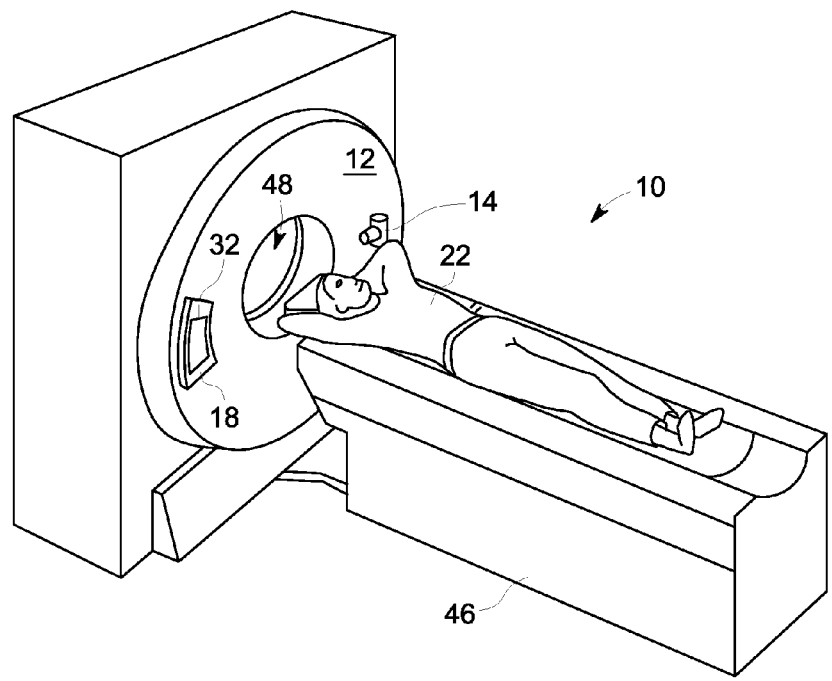
FIG. 1 is a pictorial view of a CT imaging system.
Figure 2:
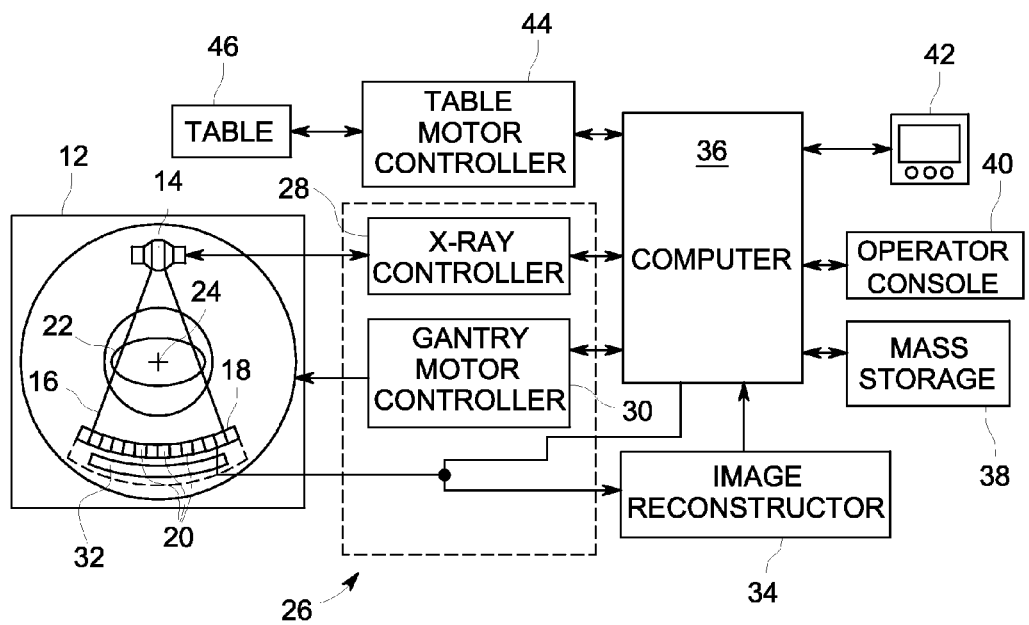
FIG. 2 is a block schematic diagram of the system illustrated in FIG. 1.

Referring to FIG. 1, a computed tomography (CT) imaging system 10 is shown as including a gantry 12 representative of a "third generation" CT scanner. Gantry 12 has an x-ray source 14 that projects a beam of x-rays toward a detector assembly or collimator 18 on the opposite side of the gantry 12. Referring now to FIG. 2, detector assembly 18 is formed by a plurality of detectors or pixilated anodes 20 and data acquisition systems (DAS) 32. The plurality of detectors 20 sense the projected x-rays 16 that pass through a subject 22, and DAS 32 converts the data to digital signals for subsequent processing. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has some form of operator interface, such as a keyboard, mouse, voice activated controller, or any other suitable input apparatus. An associated display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves subject 22 through a gantry opening 48 of FIG. 1 in whole or in part.

Figure 3:
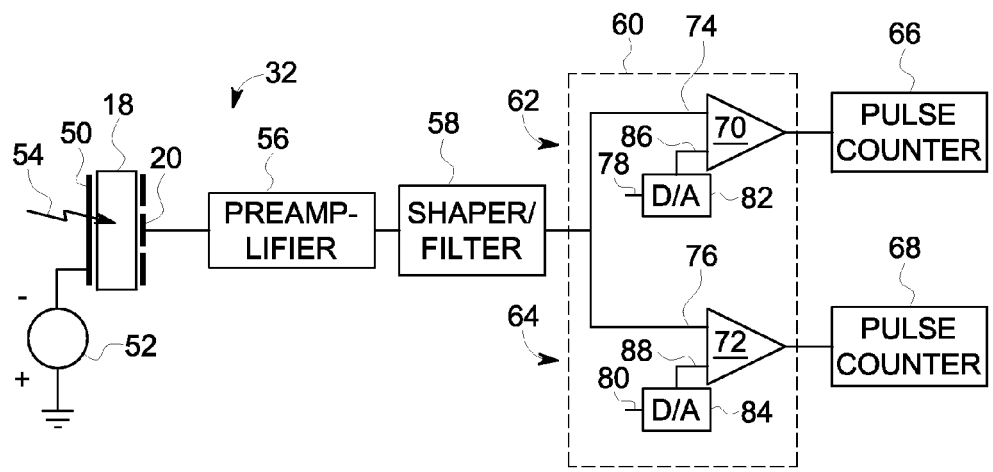
FIG. 3 is a block schematic diagram of a portion of the detector and DAS illustrated in FIG. 2.

FIG. 3 shows a portion of the detector assembly 18 and DAS 32 illustrated in FIG. 2. In one embodiment, detector assembly 18 is a direct conversion detector having a common cathode 50 coupled to a high voltage (HV) energy source 52 configured to provide a dark or bias current. Detector assembly 18 is configured to convert an x-ray photon 54 into a discrete electrical charge pulse having a corresponding amplitude indicative of its energy. The discrete electrical charge pulse is received at a respective pixilated anode 20 and is transmitted to a preamplifier 56 configured to amplify the discrete electrical charge pulse. The amplified pulse is transmitted to a shaper/filter 58 configured to shape the pulse prior to classifying the pulse into an energy bin.

In another embodiment, detector assembly 18 may be a scintillator detector assembly having scintillators and photodiodes capable of providing electrical signals at a very high speed so as to provide information indicative of the energy of single x-ray photons received at the detector assembly.

A discriminator assembly 60 has a pair of hardware discriminator channels 62, 64 coupled to respective pulse counters 66, 68 for classifying and storing the discrete electrical pulse according to its energy. Each discriminator channel 62, 64 has a comparator 70, 72 configured to compare the amplitude or energy of the discrete electrical pulse input into a first channel 74, 76 with a threshold level 78, 80 converted by a digital-to-analog converter 82, 84 and input into a second channel 86, 88 of the comparator 70, 72. Based on a comparison of the discrete electrical pulse with the threshold level, the discrete electrical pulse may be counted in one pulse counter, both pulse counters, or neither pulse counter.

As an example, discriminator channel 62 may be biased with a voltage threshold level 78 of a first, lower threshold level, and discriminator channel 64 may be biased with a voltage threshold level 80 of a second, higher threshold level. The first and second threshold levels are typically calibrated to correspond with known x-ray photon keV levels. If the energy level of the discrete electrical pulse is less than the first threshold level, then the discrete electrical pulse will not be counted in either pulse counter 66, 68. If the energy level of the discrete electrical pulse is greater than the first threshold level but less than the second threshold level, then the discrete electrical pulse will be counted in pulse counter 66 and will not be counted in pulse counter 68. If the energy level of the discrete electrical pulse is greater than the second threshold level, then the discrete electrical pulse will be counted in both pulse counters 66, 68. Accordingly, in this example, pulse counter 66 counts all discrete electrical pulses having an energy level greater than the first threshold level, which includes the discrete electrical pulses having an energy level greater than the second threshold level. Also, pulse counter 68 counts all discrete electrical pulses having an energy level greater than the second threshold level.

According to embodiments of the invention as described hereinbelow, discrete electrical pulses may be classified into a larger number of energy bins than the number of hardware discriminator channels. Through an alternating pattern of threshold pairs in successive views or shots of an x-ray beam, a variety of energy bins may be generated and later combined to classify the discrete electrical pulses into the larger number of energy bins.

Figure 4:
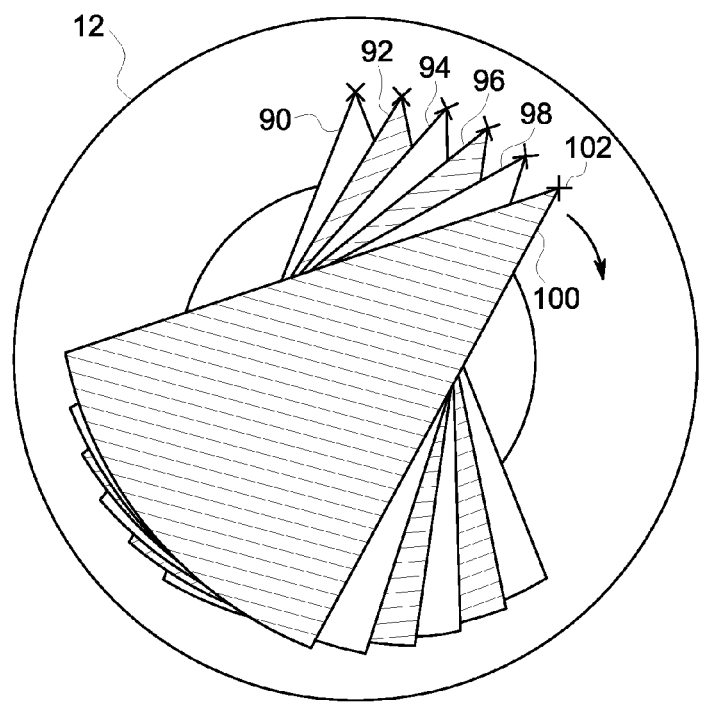
FIG. 4 is a schematic diagram of a portion of a CT scan according to an embodiment of the invention.

Referring to FIG. 4, a schematic diagram of a portion of a CT scan is illustrated. A plurality of views 90, 92, 94, 96, 98, 100 of the CT scan portion are shown as the gantry 12 rotates about the patient to acquire the imaging data. Each view represents an x-ray fan beam emitted from a focal spot 102 of x-ray source 14 (shown in FIGS. 1 and 2) and the imaging data received by detector assembly 18 (shown in FIGS. 1-3).

Views 90-100 are successive views performed one after the other during the CT scan, and in the embodiment shown, have distinct perspectives from one another as x-ray source 14 rotate about gantry 12. Furthermore, embodiments of the invention include energizing x-ray source 14 continuously at a common energy level (e.g., 140 kVp) during rotation of the gantry 12. The views 90-100 are thus defined or created by the capture of data by detector assembly 18. While the rotation distance between each successive view 90-100 has been exaggerated in FIG. 4, those skilled in the art would recognize that a much smaller rotation angle occurs in practice. For example, in a single rotation of gantry 12, two thousand or more views may be acquired in a single rotation in one embodiment.

Figure 5:
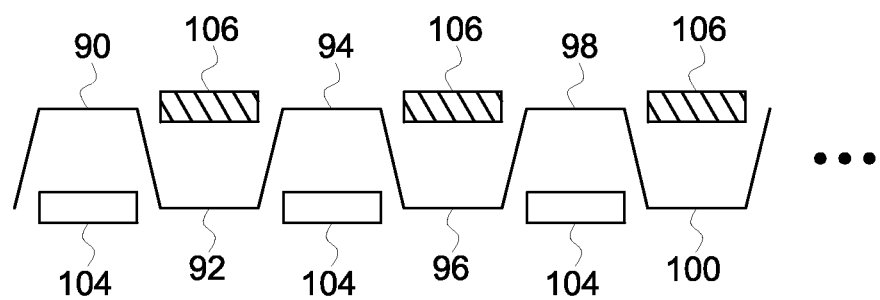
FIG. 5 is a schematic diagram of a threshold hyper-shifting technique according to an embodiment of the invention.

Referring to FIGS. 4 and 5, a threshold hyper-shifting technique is schematically shown according to an embodiment of the invention on a CT system with a 2-bin hardware discriminator channel detector array. During view 90 of the CT scan, a first threshold pair (TP) 104 comprising a first, lower threshold level and a second, higher threshold level are input into respective digital-to-analog converters 82, 84 of discriminator assembly 60 (shown in FIG. 3). Imaging data acquired during view 90 are classified into two energy bins corresponding with pulse counters 66-68. During the next, subsequent view 92, a second TP 106 comprising a first, lower threshold level and a second, higher threshold level are input into respective digital-to-analog converters 82, 84 of discriminator assembly 60. Imaging data acquired during view 92 are classified into two energy bins corresponding with pulse counters 66-68. According to embodiments of the invention, one or both of the first or second threshold levels of second TP 106 is distinct from the first and second threshold levels of first TP 104. Thereafter, first and second TPs 104-106 alternate with each successive view such that first TP 104 is applied during views 94, 98 while second TP 106 is applied during views 96, 100. First and second TPs 104-106 continue the alternating, repeating pattern throughout the remainder of the CT scan.

While FIG. 4 illustrates threshold hyper-shifting according to alternating views where each view corresponds with a respective focal spot 102, embodiments of the invention are equally applicable to focal spot wobbling techniques where the focal spot 102 occurs at a first point in space during the first view and where the focal spot 102 for the second, subsequent view is translated or wobbled to the first point in space for acquiring imaging data for the second view from the same imaging perspective as the first view. In this manner, the data acquired during the first view has approximately the same perspective as the data acquired during the second view, but the data acquired during the respective views are subject to different discriminator energy threshold levels according to the embodiments of the invention described herein.

Figure 6:
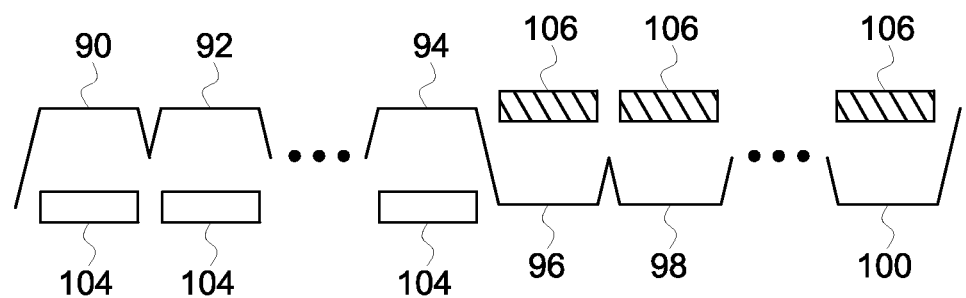
FIG. 6 is a schematic diagram of a threshold hyper-shifting technique according to another embodiment of the invention.

FIG. 6 schematically shows a threshold hyper-shifting technique according to another embodiment of the invention. In this embodiment, the threshold sets may be alternated after a number of views. For example, first threshold set 104 may be applied during a first rotation of gantry 12 (views 90-94), and second threshold set 106 may be applied during a second rotation of gantry 12 (views 96-100). In this manner, each threshold set 104, 106 may be applied during a consecutive number of views.

Figure 7:
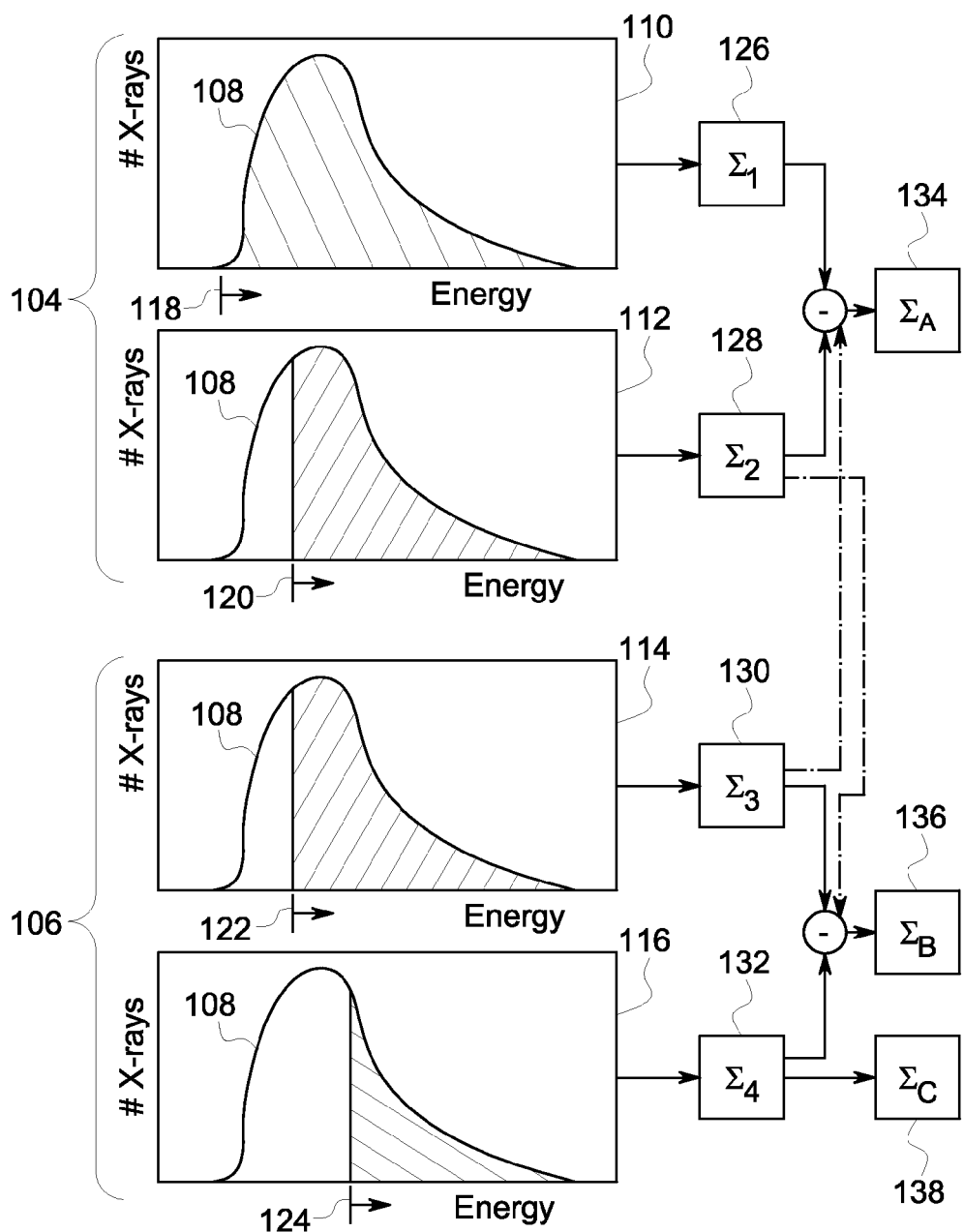
FIG. 7 is a schematic diagram of a technique for classifying acquired photon pulses into a greater number of energy bins than hardware discriminator channels according to an embodiment of the invention.

FIG. 7 graphically illustrates a technique for classifying acquired discrete electrical pulses into three energy bins using two hardware discriminator channels such as channels 62, 64 of FIG. 3 according to an embodiment of the invention. A plot curve envelope 108 schematically shows the x-ray photon energy data received at detector assembly 18 during the CT scan. During the views 92-100, a plurality of plots 110, 112, 114, and 116 illustrates an example of photon energy data that may be received by detector assembly 18 during a CT scan. During the views 92-100 corresponding with first TP 104, first plot 110 shows the data having an energy level above the first threshold level 118 of first TP 104 that is counted by pulse counter 66, and a second plot 112 shows the data that is counted having an energy level above the second threshold level 120 of first TP 104 that is counted by pulse counter 68. During the views 92-100 corresponding with second TP 106, third plot 114 shows the data having an energy level above the first threshold level 122 of second TP 106 that is counted by pulse counter 66, and fourth plot 116 shows the data having an energy level above the second threshold level 124 of second TP 106 that is counted by pulse counter 68.

After the CT scan, a first dataset 126 of stored data represents the sum of the number of x-ray photons having energy levels greater than or equal to first threshold level 118 of first TP 104, and a second dataset 128 of stored data represents the sum of the number of x-ray photons having energy levels greater than or equal to second threshold level 120 of first TP 104. Similarly, a third dataset 130 of stored data represents the sum of the number of x-ray photons having energy levels greater than or equal to first threshold level 118 of second TP 106, and a fourth dataset 132 of stored data represents the sum of the number of x-ray photons having energy levels greater than or equal to second threshold level 120 of second TP 106.

Figure 8:
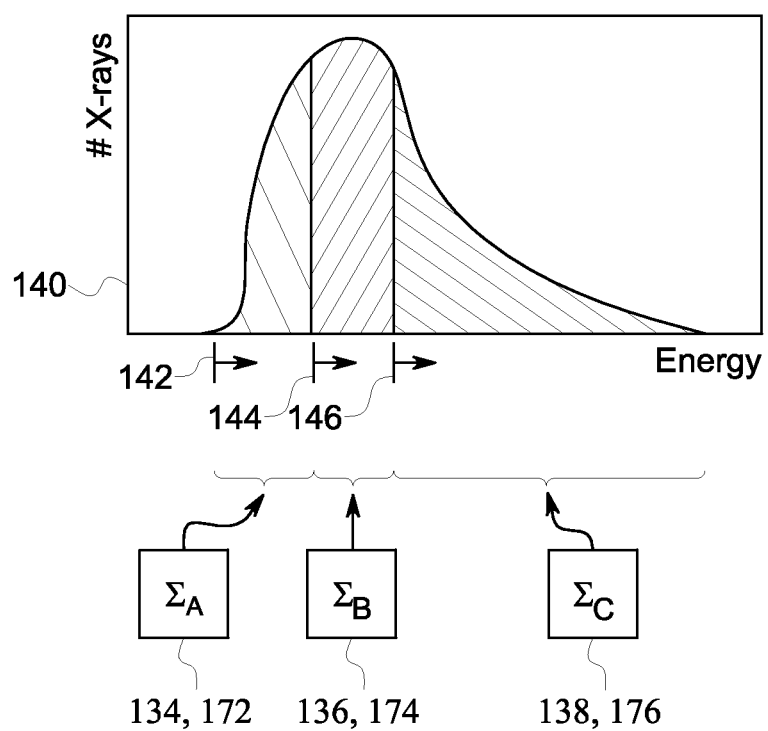
FIG. 8 is a plot graphically showing an example of data collected and classified during the exemplary CT scan of FIG. 7 according to an embodiment of the invention.

According to an embodiment of the invention, the four datasets 126-132 are combined into three final datasets or energy bins 134, 136, 138. To determine the final energy bin 134, second dataset 128 is subtracted from first dataset 126. To determine the final energy bin 136, fourth dataset 132 is subtracted from third dataset 130. Final energy bin 138 corresponds to the data collected in fourth dataset 132. Referring to FIG. 8, final energy bins 134-138 are illustrated together with a plot 140 showing an example of the total data collected during the exemplary CT scan of FIG. 7 as if the total data, instead of being collected by two hardware discriminator channels, were collected by three hardware discriminator channels, each having a respective energy threshold 142, 144, 146. An image may be reconstructed based on final energy bins 134-138.

Still referring to FIG. 7, as shown in phantom, according to another embodiment of the invention, a combination of first dataset 126 and third dataset 130 (instead of second dataset 128) may be used to generate energy bin 134, and a combination of fourth dataset 132 and second dataset 128 (instead of third dataset 130) may be used to generate energy bin 136. Accordingly, embodiments of the invention allow for flexibility in combining generated datasets to generate the final energy bins.

Figure 9:
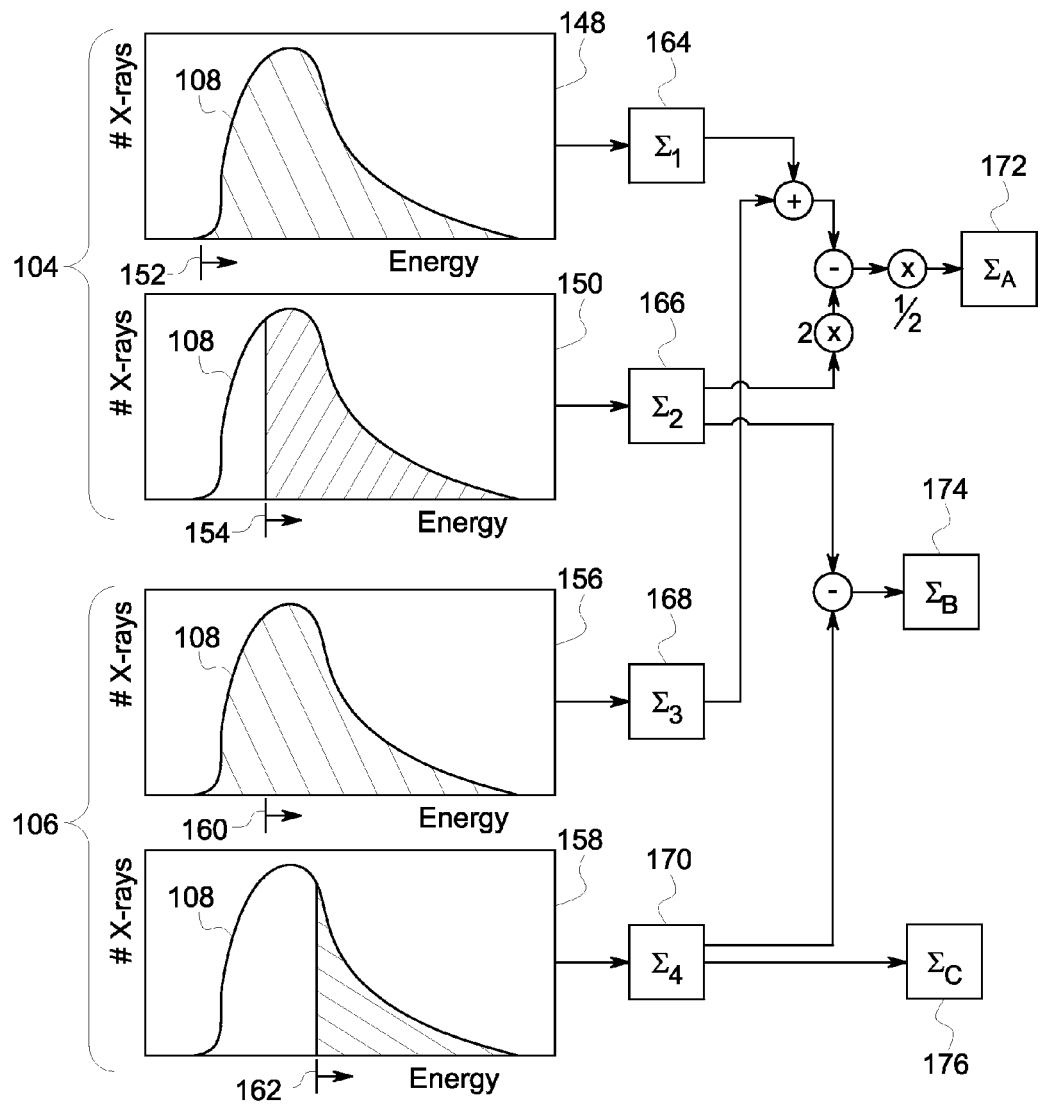
FIG. 9 is a schematic diagram of an alternative technique for classifying acquired photon pulses into a greater number of energy bins than hardware discriminator channels according to an embodiment of the invention.

FIG. 9 shows an alternative way to collect and combine x-ray photon data that results in three energy bins from two hardware discriminator channels using an energy threshold hyper-shifting technique according to an embodiment of the invention. Similar to that shown in FIG. 7, first and second TPs 104, 106 are used to classify x-ray photons. Also similar to that shown in FIG. 7, plots 148 and 150 show that, during the views 92-100 corresponding with first TP 104, first and second threshold levels 152, 154 are configured to classify x-ray photon energy at approximately similar energy values as first and second threshold levels 118, 120 of FIG. 7. As shown in plots 156 and 158 of second TP 106, the second threshold level 162 is configured to classify x-ray photon energy at approximately a similar energy value as second threshold level 124 of FIG. 7, but the first threshold level 160 is configured to classify x-ray photon energy at approximately a similar energy value as first threshold level 152 of FIG. 9.

The combination of datasets 164, 166, 168, 170 into the three final datasets or energy bins 172, 174, 176 is varied from that described above with respect to FIG. 7. To generate energy bin 172, first dataset 164 is added to third dataset 168, and second dataset 166 is multiplied by two. Then, the multiplication of second dataset 166 is subtracted from the sum of first dataset 164 with third dataset 168. Since first dataset 164 is added to third dataset 168 and second dataset 166 is multiplied by two, the result of the subtraction is inflated by a factor of two. Accordingly, the result of the subtraction is multiplied by one half to generate energy bin 172.

To generate energy bin 174, fourth dataset 170 is subtracted from second dataset 166. Finally, energy bin 176 corresponds to the data collected in fourth dataset 170. Plot 140 of FIG. 8 may also schematically represent an example of the total data collected during the exemplary CT scan of FIG. 9 as if the total data, instead of being collected by two hardware discriminator channels, were collected by three hardware discriminator channels, each having a respective energy threshold 142-146.

In one embodiment, that described above with respect to FIG. 9 may be performed after the CT or other imaging scan has been performed. That is, datasets 164-170 may represent the raw data summed by the respective hardware discriminator channels during the imaging scan. Then, following the imaging scan, energy bins 172-176 may be calculated as described herein.

It is contemplated, however, that respective energy bins 172-176 may be calculated during the imaging scan based on neighboring views. In one embodiment, respective energy bins 172-176 may be calculated using the data acquired in two neighboring views. Then, each of the respective energy bins 172-176 may be finally combined together to determine the total count of photons received at the respective energies corresponding with energy bins 172-176.

In another embodiment, at least some of the respective energy bins 172-176 may be calculated using the data acquired in three neighboring views. Referring to that shown in FIG. 9 in an example, the classification of data acquired during a first view 104(1) may result in a pair of datasets 164(1) and 166(1). In a subsequent, second view 106(2), the classification of acquired data may result in a pair of datasets 168(2), 170(2). Repeating the classification of data acquired during third and fourth views (104(3) and 106(4)) may result in respective pairs of datasets 164(3), 166(3) and 168(4), 170(4). Further classification of acquired data may be performed according to the sequence.

During the imaging scan in this embodiment, a first respective set of energy bins 172(1)-176(1) may be calculated, for example, based on the combination of datasets 164(1)-170(2) as illustrated in FIG. 9. However, a second respective set of energy bins 172(2)-176(2) may be calculated based on the combination of datasets 166(1), 166(3), 168(2), and 170(2). For example, energy bin 172(2) may be calculated by subtracting the average of datasets 166(1) and 166(3) from dataset 168(2). Energy bin 174(2) may be calculated by subtracting dataset 170(2) from the average of datasets 166(1) and 166(3), and energy bin 176(2) may be calculated as the value of dataset 170(2).

A third respective set of energy bins 172(3)-176(3) may be calculated based on the combination of datasets 164(3), 166(3), 170(2), and 170(4). For example, energy bin 172(3) may be calculated by subtracting dataset 166(3) from dataset 164(3). Energy bin 174(3) may be calculated by subtracting the average of datasets 170(2) and 170(4) from dataset 166(3) and energy bin 176(2) may be calculated as the average of datasets 170(2) and 170(4).

The calculation of further respective sets of energy bins acquired during the imaging scan in this embodiment may be based on the calculation of the second or third respective sets of energy bins as described above. While the calculation of energy bins 172-176 based on two views allows for their calculation based on linear interpolation, the calculation of energy bins 172-176 based on three views allows for interpolation techniques to be used that have increased accuracy.

Figure 10:
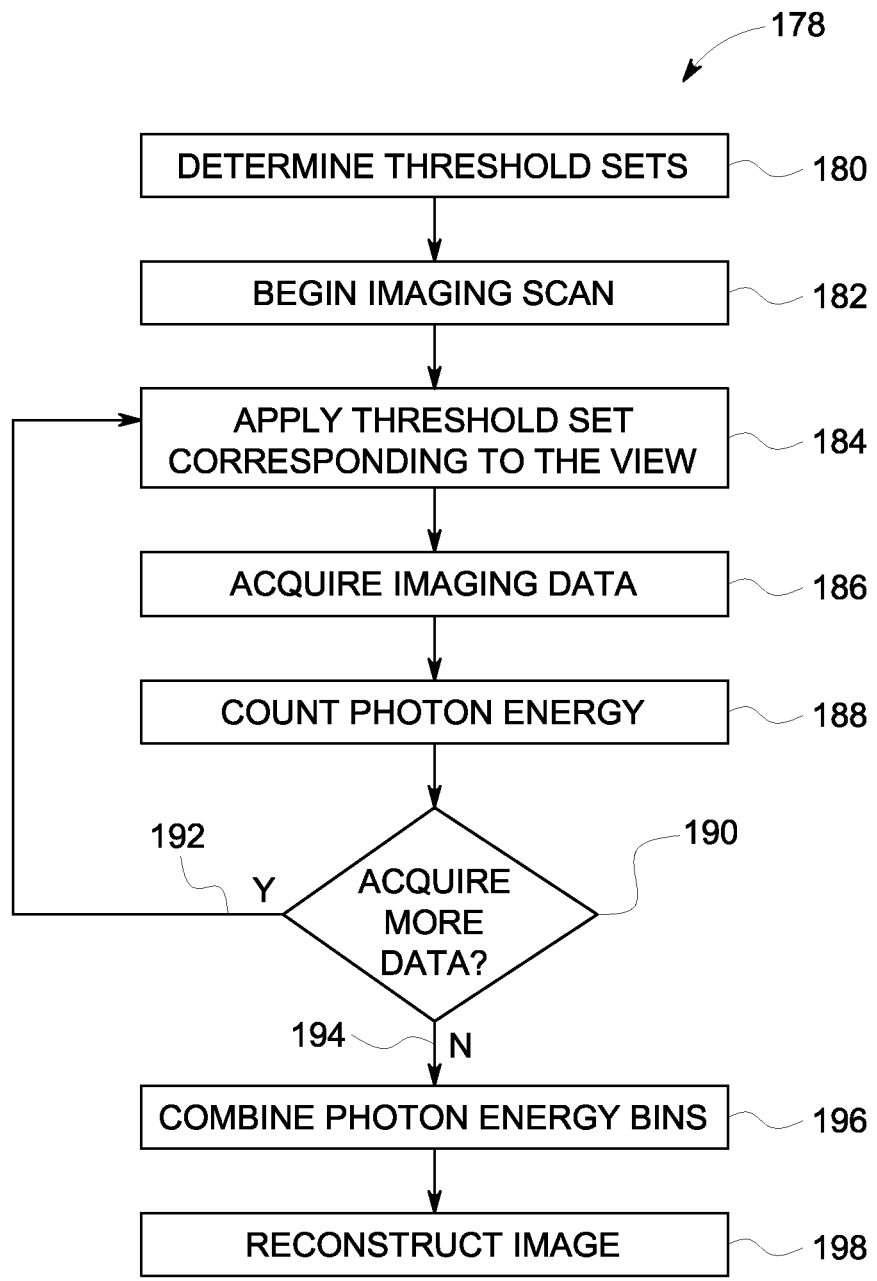
FIG. 10 is a flowchart showing a threshold switching technique according to an embodiment of the invention.

FIG. 10 illustrates a flowchart for a technique 178 for threshold switching according to an embodiment of the invention. Technique 178 begins at block 180 with the determination of a plurality of threshold sets. In an imaging system having a fixed number of hardware discriminator channels, block 180 includes determining a threshold set having a respective threshold value for each respective hardware discriminator channel and determining the number of threshold sets based on the number of desired final energy bins. In the embodiments described above with respect to FIGS. 7 and 9, two threshold pair sets were used where each threshold pair set included two threshold values for the pair of hardware discriminator channels of the exemplary imaging system. Energy data that were classified based on the four threshold values (two of which being substantially equal) were used and combined to generate three final energy bins. Accordingly, the number of final energy bins is greater than the number of hardware discrimination channels. As such, embodiments of the invention allow for using M hardware discrimination channels to generate N final energy bins, where M is a number greater than or equal to 1, and where N is a number greater than M.

While two of the energy threshold values used in the example embodiments of FIGS. 7 and 9 were chosen so as to substantially match one another, embodiments of the invention may include threshold sets having substantially distinct energy values among all threshold sets. For example, in a pair of TPs having four distinct energy threshold values, one skilled in the art would recognize, based on that described herein, that two hardware discriminator channels may be used to generate four final energy bins. Thus, the number of final energy bins has doubled the number of hardware discriminator channels. Likewise, a single-channel system may use a pair of distinctive energy threshold values for alternating views to generate two final energy bins from the single-channel system. Other combinations are also possible and considered to be within the scope of embodiments of the invention.

At block 182, an imaging scan is begun, and a first of the determined threshold sets is applied at block 184. Imaging data is acquired at block 186, and photon energy is counted in the respective discriminator channels at block 188.

At block 190, technique 178 determines whether more imaging data should be acquired. If more data is to be acquired 192, process control returns to block 184 for application of a threshold set. In one embodiment where x-ray photon energy data is to be classified or counted according to respective threshold values in alternating subsequent views or shots of x-ray photons (such as described with respect to FIGS. 4 and 5), the threshold set applied as process control returns to block 184 includes a hyper-shifting of the applied threshold sets such that an alternating threshold set of the respective corresponding view is applied at each emission of x-ray photon energy from x-ray source 14. In another embodiment where x-ray photon energy data is to be classified or counted according to respective threshold values in alternating groups of views or shots of x-ray photons (such as described with respect to FIG. 6), the threshold set applied as process control returns to block 184 includes a hyper-shifting of the applied threshold sets after each group of views. As such, the rate of hyper-shifting may thus vary according to the desired imaging scan to be completed.

If no more data is to be acquired 194, the counted photon energy is combined at block 196 to form a number of final energy bins greater than the number of hardware discriminator channels of the imaging system. As described above in FIGS. 7 and 9, three final energy bins were formed from the exemplary imaging system having two hardware discriminator channels. An image is reconstructed at block 198 based on the photon energy bins calculated at block 196.

According to an alternative embodiment, the counted photon energy may be combined at block 196 to form a single final energy bin, and an image may be reconstructed at block 198 based on the single photon energy bin calculated at block 196.

Figure 11:
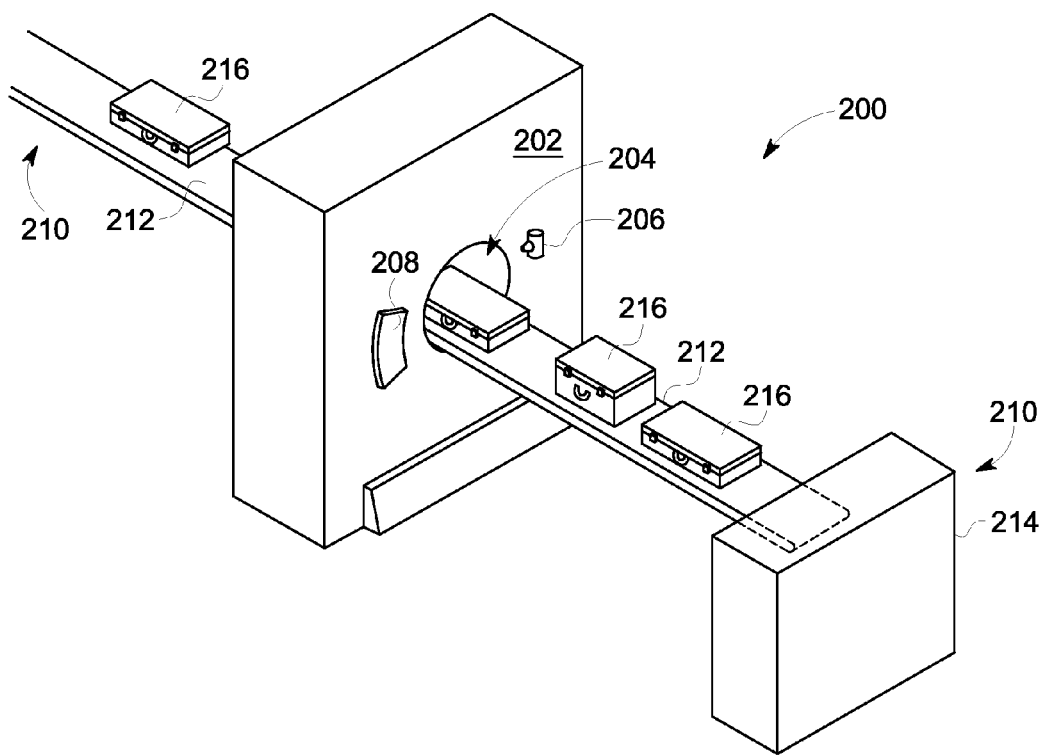
FIG. 11 is a pictorial view of a CT system for use with a non-invasive package inspection system.

Referring now to FIG. 11, an x-ray system 200 includes a gantry 202 having an opening 204 therein through which imaging objects may pass. While packages or pieces of baggage are shown in FIG. 11, embodiments of the invention contemplate imaging patients as well. The gantry 202 houses a high frequency electromagnetic energy source 206 as well as a detector assembly 208 having direct conversion detector cells. Gantry 202 may be rotatable or non-rotatable. A conveyor system 210 is also provided and includes a conveyor belt 212 supported by structure 214 to automatically and continuously pass packages or baggage pieces 216 through opening 204 to be scanned. Objects 216 are fed through opening 204 by conveyor belt 212, imaging data is then acquired, and the conveyor belt 212 removes the packages 216 from opening 204 in a controlled and continuous manner. As a result, postal inspectors, baggage handlers, and other security personnel may non-invasively inspect the contents of packages 216 for explosives, knives, guns, contraband, etc.

A non-CT x-ray imaging system, such as an embodiment of package/baggage inspection system 200 having a non-rotatable gantry 202, may benefit from an incorporation of threshold hyper-shifting according to embodiments of the invention. While the x-ray or high frequency electromagnetic energy source 206 is not configured to rotate about the imaging subjects 216, multiple views may nevertheless be performed to apply respective threshold sets to count photon energy in multiple energy bins so as to form a number of final energy bins greater than the number of hardware discriminator channels of the non-CT x-ray imaging system according to embodiments of the invention.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

A technical contribution for the disclosed method and apparatus is that it provides for a computer implemented method of classifying x-ray energy into discrete levels.

Therefore, according to an embodiment of the invention, an imaging system comprises an x-ray source configured to project a beam of x-rays toward an object to be imaged, a detector configured to receive x-rays emitted from the x-ray source, and a data acquisition system (DAS) operably coupled to the detector, the DAS comprising a discriminator assembly configured to count photon hits in the detector that occur at photon energies greater than or equal to a threshold level. A computer is operably coupled to the DAS and programmed to cause the discriminator assembly to count photon hits in the detector having an energy level greater than or equal to a first threshold level during an imaging scan and to cause the discriminator assembly to count photon hits in the detector having an energy level greater than or equal to a second threshold level during the imaging scan, wherein the second threshold level is distinct from the first threshold level. The computer is further programmed to modify the counted photon hits having an energy level greater than or equal to the first threshold level based on the counted photon hits having an energy level greater than or equal to the second threshold level and to reconstruct an image based on the modified photon hits and based on the counted photon hits having an energy level greater than or equal to the second threshold level.

According to another embodiment of the invention, a non-transitory computer readable medium has thereon a computer program comprising instructions, which, when executed by a computer, cause the computer to cause an x-ray source to project a plurality of x-ray beams toward an object to be imaged, to cause a detector to convert received x-rays into photon energy information, and to cause a discriminator assembly to count photon energy levels from the photon energy information having an energy level greater than or equal to a first threshold level during a first set of the plurality of x-ray beams. The instructions further cause the computer to cause the discriminator assembly to count photon energy levels from the photon energy information having an energy level greater than or equal to a second threshold level during a second set of the plurality of x-ray beams, wherein the second threshold level is different from the first threshold level. The instructions further cause the computer to modify the photon hits counted from the first set of the plurality of x-ray beams based on the photon hits counted from the second set of the plurality of x-ray beams and to reconstruct an image based on the modified photon hits and based on the photon hits counted from the second set of the plurality of x-ray beams.

According to yet a further embodiment of the invention, an x-ray system comprises a high frequency electromagnetic energy projection source configured to project a high frequency electromagnetic energy beam toward an object to be scanned during an imaging scan and a direct conversion array having a plurality of direct conversion cells wherein each cell is configured to detect high frequency electromagnetic energy passing through the object and to convert the detected energy into electrical energy signals during each of a plurality of x-ray views. A data acquisition system (DAS) is connected to the direct conversion array and configured to receive the electrical photon energy signals, wherein the DAS comprises a plurality of hardware discriminator channels, and wherein each hardware discriminator channel is configured to count a number of photons having an energy greater than or equal to a respective energy threshold level from the electrical photon energy signals. A computer is programmed to input a first set of energy threshold levels to the respective hardware discriminator channels during a first set of the plurality of x-ray views and to input a second set of energy threshold levels to the respective hardware discriminator channels during a second set of the plurality of x-ray views. The computer is also programmed to obtain a plurality of photon counts during the first and second sets of x-ray views from photons having energy levels greater than or equal to the respective first and second sets of energy threshold levels and to transform a first photon count of the plurality of photon counts based on a second photon count of the plurality of photon counts. The x-ray system also comprises an image reconstructor connected to the computer and configured to reconstruct an image of the object based on the transformed first photon count and on the second photon count.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An imaging system comprising:
an x-ray source configured to project a beam of x-rays toward an object to be imaged;
a detector configured to receive x-rays emitted from the x-ray source;
a data acquisition system (DAS) operably coupled to the detector, the DAS comprising a discriminator assembly configured to count photon hits in the detector that occur at photon energies greater than or equal to a threshold level; and
a computer operably coupled to the DAS and programmed to:
 cause the discriminator assembly to count photon hits in the detector having an energy level greater than or equal to a first threshold level during an imaging scan;
 cause the discriminator assembly to count photon hits in the detector having an energy level greater than or equal to a second threshold level during an the imaging scan, wherein the second threshold level is distinct from the first threshold level;
 modify the counted photon hits having an energy level greater than or equal to the first threshold level based on the counted photon hits having an energy level greater than or equal to the second threshold level; and reconstruct an image based on the modified photon hits and based on the counted photon hits having an energy level greater than or equal to the second threshold level.

2. The imaging system of claim 1 wherein the computer is further programmed to:

cause the discriminator assembly to count the photon hits in the detector having an energy level greater than or equal to the first threshold level during a first view of the imaging scan; and cause the discriminator assembly to count the photon hits in the detector having an energy level greater than or equal to the second threshold level during a second view of the imaging scan.

3. The imaging system of claim 2 wherein the first and second views alternate during the imaging scan.

4. The imaging system of claim 2 wherein the imaging system further comprises a rotatable gantry configured to rotate about the object to be imaged; and wherein the computer is further programmed to:

cause the x-ray source to project the beam of x-rays during the first view from a first x-ray focal spot located in a first point in space during gantry rotation; and cause the x-ray source to project the beam of x-rays during the second view from the first x-ray focal spot located in a second point in space during gantry rotation.

5. The imaging system of claim 2 wherein the imaging system further comprises a rotatable gantry configured to rotate about the object to be imaged; and wherein the computer is further programmed to:

cause the x-ray source to project the beam of x-rays during the first view from a first x-ray focal spot located in a first point in space during gantry rotation; and cause the x-ray source to project the beam of x-rays during the second view from a second x-ray focal spot located in the first point in space during gantry rotation.

6. The imaging system of claim 1 wherein the computer is further programmed to:

cause the discriminator assembly to count the photon hits in the detector having an energy level greater than or equal to the first threshold level during a first group of consecutive views of the imaging scan; and cause the discriminator assembly to count the photon hits in the detector having an energy level greater than or equal to the second threshold level during a second group of consecutive views of the imaging scan.

7. The imaging system of claim 6 wherein each of the first and second groups of consecutive views corresponds with a full gantry rotation.

8. The imaging system of claim 1 wherein the discriminator assembly comprises a single discriminator channel.

9. The imaging system of claim 1 wherein the discriminator assembly comprises a plurality of discriminator channels; and wherein the computer, in being programmed to cause the discriminator assembly to count photon hits in the detector having energy levels greater than or equal to the first and second threshold levels, is programmed to cause the discriminator assembly to count photon hits in the detector having energy levels greater than or equal to a plurality of threshold levels;

wherein the plurality of distinct threshold levels comprises the first and second threshold levels; and wherein the plurality of threshold levels comprises a number of distinct threshold levels greater than the number of the plurality of discriminator channels.

10. The imaging system of claim 9 wherein the plurality of threshold levels comprises a third threshold level having a threshold level substantially matching that of one of the number of distinct threshold levels.

11. The imaging system of claim 1 wherein the detector comprises a direct conversion array having a plurality of direct conversion cells wherein each cell is configured to detect high frequency electromagnetic energy passing through the object and to directly convert the detected energy into electrical energy signals.

12. The imaging system of claim 1 wherein the detector comprises a scintillator array configured to output an electrical signal for each photon hit and corresponding with the energy level thereof, the scintillator array comprising:

a plurality of scintillator cells configured to detect high frequency electromagnetic energy passing through the object and to convert the detected energy into light energy; and a plurality of photodiodes configured to detect the light energy and to convert the detected light energy into the electrical signals.

13. A non-transitory computer readable medium having thereon a computer program comprising instructions, which, when executed by a computer, cause the computer to:

cause an x-ray source to project a plurality of x-ray beams toward an object to be imaged;

cause a detector to convert received x-rays into photon energy information;

cause a discriminator assembly to count photon energy levels from the photon energy information having an energy level greater than or equal to a first threshold level during a first set of the plurality of x-ray beams;

cause the discriminator assembly to count photon energy levels from the photon energy information having an energy level greater than or equal to a second threshold level during a second set of the plurality of x-ray beams, wherein the second threshold level is different from the first threshold level;

modify the photon hits counted from the first set of the plurality of x-ray beams based on the photon hits counted from the second set of the plurality of x-ray beams; and reconstruct an image based on the modified photon hits and based on the photon hits counted from the second set of the plurality of x-ray beams.

14. The computer readable medium of claim 13 wherein the instructions that cause the computer to cause the discriminator assembly to count photon energy levels cause the computer to cause the discriminator assembly to alternate the count of photon energy levels having an energy level greater than or equal to the first threshold level and the count of photon energy levels having an energy level greater than or equal to the second threshold level among successive views.

15. The computer readable medium of claim 13 wherein the instructions that cause the computer to cause the discriminator assembly to count photon energy levels cause the computer to cause the discriminator assembly to count photon energy levels during the first and second sets of x-ray beams via a first hardware discriminator channel.

16. The computer readable medium of claim 15 wherein the instructions further cause the computer to:

cause the discriminator assembly to count photon energy levels via a second hardware discriminator channel from the photon energy information having an energy level greater than or equal to a third threshold level during the first set of the plurality of x-ray beams;

cause the discriminator assembly to count photon energy levels via the second hardware discriminator channel from the photon energy information having an energy level greater than or equal to a fourth threshold level during the second set of the plurality of x-ray beams; and wherein one of the third and fourth threshold levels is different from the first and second threshold levels.

17. The computer readable medium of claim 13 wherein the instructions that cause the computer to cause the x-ray source to project the plurality of x-ray beams cause the computer to cause the x-ray source to project the first and second sets of x-ray beams at a common energy level.

18. An x-ray system comprising:

a high frequency electromagnetic energy projection source configured to project a high frequency electromagnetic energy beam toward an object to be scanned during an imaging scan;

a direct conversion array having a plurality of direct conversion cells wherein each cell is configured to detect high frequency electromagnetic energy passing through the object and to convert the detected energy into electrical energy signals during each of a plurality of x-ray views;

a data acquisition system (DAS) connected to the direct conversion array and configured to receive the electrical photon energy signals, wherein the DAS comprises a plurality of hardware discriminator channels, and wherein each hardware discriminator channel is configured to count a number of photons having an energy greater than or equal to a respective energy threshold level from the electrical photon energy signals;

a computer programmed to:

input a first set of energy threshold levels to the respective hardware discriminator channels during a first set of the plurality of x-ray views;

input a second set of energy threshold levels to the respective hardware discriminator channels during a second set of the plurality of x-ray views;

obtain a plurality of photon counts during the first and second sets of x-ray views from photons having energy levels greater than or equal to the respective first and second sets of energy threshold levels; and transform a first photon count of the plurality of photon counts based on a second photon count of the plurality of photon counts; and an image reconstructor connected to the computer and configured to reconstruct an image of the object based on the transformed first photon count and on the second photon count.

19. The x-ray system of claim 18 wherein a number of discrete energy threshold levels in a combination of the first and second sets of energy threshold levels is greater than the number of hardware discriminator channels of the DAS.

20. The x-ray system of claim 18 further comprising a rotatable gantry having an opening to receive the object to be scanned; and wherein the high frequency electromagnetic energy projection source is coupled to the rotatable gantry.

21. The x-ray system of claim 20 wherein the computer is further programmed to:

rotate the high frequency electromagnetic energy projection source about the object during the imaging scan; and obtain the plurality of photon counts during an alternating pattern of the first and second sets of x-ray views.

22. The x-ray system of claim 20 wherein the computer is further programmed to:

rotate the high frequency electromagnetic energy projection source about the object during the imaging scan; and obtain a first portion of the plurality of photon counts during a consecutive group of sequential first set of x-ray views; and obtain a second portion of the plurality of photon counts during a consecutive group of sequential second set of x-ray views applied after the consecutive group of sequential first set of x-ray views.

* * * * *

UNITED STATES PATENT AND TRADEMARK OFFICE
CERTIFICATE OF CORRECTION

| | | |
|---|---|---|
| PATENT NO. | : 8,488,854 B2 | Page 1 of 1 |
| APPLICATION NO. | : 13/313281 | |
| DATED | : July 16, 2013 | |
| INVENTOR(S) | : Arenson et al. | |

It is certified that error appears in the above-identified patent and that said Letters Patent is hereby corrected as shown below:

In the Claims

Col. 12, line 63 (Claim 1), delete "during an the imag-" and substitute therefore -- during the imag- --.

Signed and Sealed this
Twenty-eighth Day of January, 2014

Michelle K. Lee
*Deputy Director of the United States Patent and Trademark Office*